F. W. WEBER.
ANTISKID DEVICE FOR VEHICLE WHEELS.
APPLICATION FILED OCT. 23, 1916. RENEWED JAN. 18, 1919.

1,301,988.

Patented Apr. 29, 1919.
2 SHEETS—SHEET 1.

WITNESSES:
J. M. Haines.
A. A. Olson.

INVENTOR.
Florian W. Weber.
BY
his ATTORNEY

F. W. WEBER.
ANTISKID DEVICE FOR VEHICLE WHEELS.
APPLICATION FILED OCT. 23, 1916. RENEWED JAN. 18, 1919.

1,301,988.

Patented Apr. 29, 1919.
2 SHEETS—SHEET 2.

WITNESSES:
J. M. Haines.
A. A. Olson.

INVENTOR.
Florian W. Weber.
BY
his ATTORNEY

UNITED STATES PATENT OFFICE.

FLORIAN W. WEBER, OF CHICAGO, ILLINOIS.

ANTISKID DEVICE FOR VEHICLE-WHEELS.

1,301,988.  Specification of Letters Patent.  Patented Apr. 29, 1919.

Application filed October 23, 1916, Serial No. 127,260. Renewed January 18, 1919. Serial No. 271,887.

*To all whom it may concern:*

Be it known that I, FLORIAN W. WEBER, a citizen of the United States, and a resident of the city of Chicago, county of Cook, and State of Illinois, have invented certain new and useful Improvements in Antiskid Devices for Vehicle-Wheels, of which the following is a specification.

My invention relates to improvements in anti-skid devices for vehicle wheels, and has for its object the production of a device of this character which will be of extremely simple and economical construction, one which may be readily and easily applied, and which will be highly efficient in use.

A further object is the production of an anti-skid device, as mentioned, in which the parts will be so connected as to permit of ready replacing or renewal of parts when the same become worn or disabled.

Other objects will appear hereinafter.

With these objects in view, the invention consists in the combinations and arrangements of parts hereinafter described and claimed.

Figure 1:
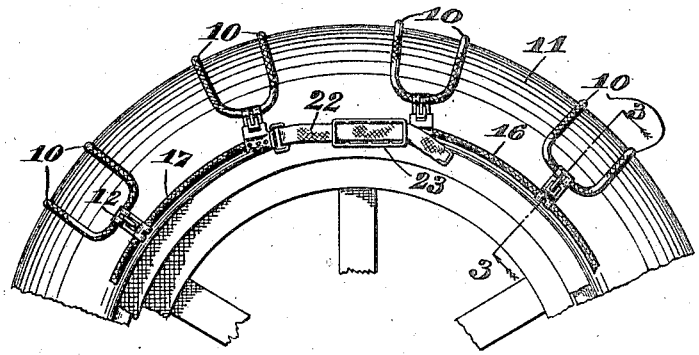
Figure 2:
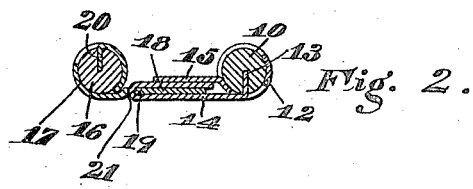
Figure 3:
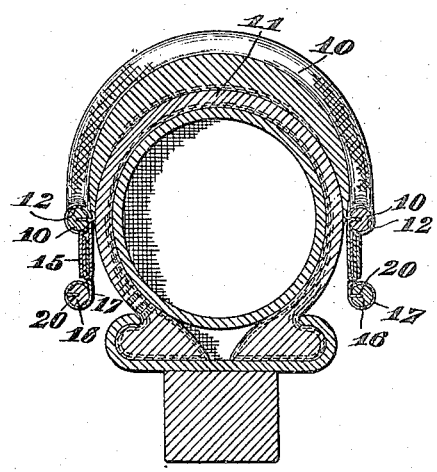
Figure 4:
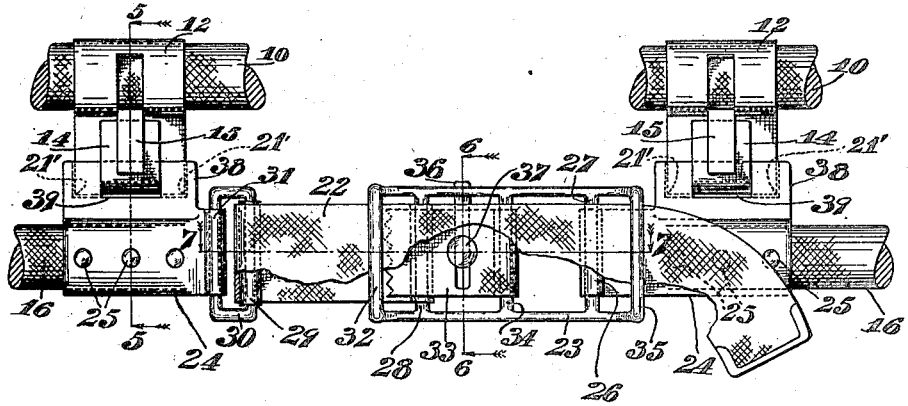
Figure 5:
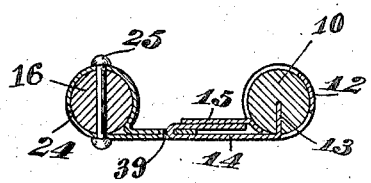
Figure 6:
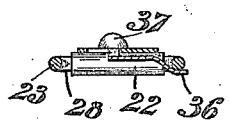
Figure 7:
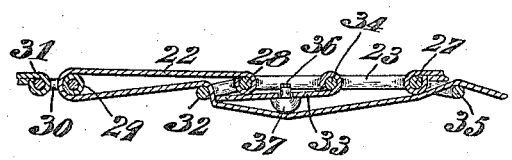

The invention will be best understood by reference to the accompanying drawings forming a part of this specification, and in which, Figure 1 is a side elevation of a fragment of a vehicle wheel equipped with an antiskid device embodying the invention, Fig. 2 is an enlarged detail section taken through one of the connections between the cross and side members of the device, Fig. 3 is an enlarged section taken on line 3—3 of Fig. 1, Fig. 4 is a detail side elevation of the portion of the device at the point of connection of the ends of one of the side members, portions of the construction being broken away in order to expose underlying parts, and Figs. 5, 6 and 7, are sections taken on lines 5—5, 6—6 and 7—7 respectively, of Fig. 4.

The preferred form of construction, as illustrated in the drawings, comprises a plurality of spaced cross members 10 which are adapted to extend transversely across the tread of the wheel 11 in conjunction with which the device is employed. The cross members 10 are arranged in pairs, each pair being formed of a single piece of material which is bent upon itself into substantially elongated looped or oval form, as clearly shown in Fig. 1. The ends of the member from which each pair of cross members 10 is formed are securely connected together by means of a sheet metal connecting device 12 one end of which is looped or wrapped around the contiguously positioned ends of said member and pressed into secure engagement therewith. To securely hold said ends in engagement with the embracing portion of said connecting member, the latter is preferably provided with a prong 13 which pierces the member 10, as seen in Fig. 2. At the opposite side of the wheel, or at the bight portion of the member from which each pair of cross members 10 are formed, is provided a similar connecting member 12 which similarly embraces the same. Each member 12 is formed with a tongue or hook 14 and a retaining tongue 15 stamped from said member which is adapted to coöperate with the tongue 14, that is to engage against the outer side thereof in order to hold the same in operative position, as clearly shown in Figs. 2 and 4.

Provided at the opposite sides of the wheel, extending around the same, are annular side members 16 to which the connecting members 12 are fastened. The connection between the members 12 and the side members 16 comprises a plurality of sheet metal connecting members 17 which are spaced along each of said side members, one end of each of said connecting members 17 being looped or wrapped around the member 16, as clearly shown in Fig. 2. Each of said members 17 is formed with a lug or lip 18 in which is formed a slot 19 adapted for engagement with the reduced outer end of the tongue 14 of the corresponding connecting member 12, as seen in the several views. In order to securely lock the connecting members 17 to the side members 16, the former are provided with prongs 20 which pierce the members 16, as seen in Fig. 2. The lips or lugs 18 are off-set as at 21, in order to accommodate the inner side of the corresponding tongue 14 so as to present a surface without obstructions or protrusions for contact with the side of the tire and thus reduce wear upon the tire to a minimum. The off-set 21 in each member 17 also affords a shoulder which engages against the end of said member which is wrapped around the side members 16, serving to hold said end in embracing position, as seen in Fig. 2. Also, the shoulder formed by said off-set is adapted for engagement with shoulders 21' on the tongue 14, as shown in Fig. 4, in order to serve as a means of preventing relative lateral tilting of the members 12 and 17. The prevention of such tilting of said parts insures against the reduced ends of the tongues 14 being bent and possibly torn off under heavy lateral pressure, such as the same would be subjected to where the device is used in connection with a heavy truck. In assembling the parts, that is in engaging the connecting members 12 with the connecting members 17, the retaining tongues 15 are bent outwardly and the outer ends of hooks 14 are bent to a position to permit of the same being inserted into engagement with slots 19. After said tongues 14 have been engaged with said slots, the same are bent into closed or operative position and the retaining tongues 15 bent into engagement therewith, as seen in Fig. 2, thereby securely locking the connecting members together. The connection is such, however, that in case of wear or disabling of the cross members 10, said connecting members may be readily disengaged in order to permit of the insertion of new parts.

The ends of each of the side members 16 are adjustably connected together by means of a flexible strap 22 and a coöperating buckle 23. In order to accommodate these parts, the ends of each side member are provided with sheet metal end members 24 which are formed to embrace the ends of said side members, the same being rigidly secured thereto, as by means of rivets 25, or other suitable means of fastening. One of the end members 24 is formed with a loop 26 which embraces a cross bar 27 of the buckle 23. To another cross bar 28 of said buckle is secured one end of the strap 22, said strap extending therefrom around a roller 29 provided upon one side of a link or loop 30 carried by the end 31 of the other member 24, said strap 22 then passing under the end bar 32 of the buckle and around the toothed end of a pawl 33, pivotally mounted upon another bar 34 of the buckle, whence the end of the strap is passed around the other end bar 35 of the buckle. The arrangement is such, as will be seen, that the ends of each side member may be readily adjusted through manipulation of the strap 22 in order to properly adjust the cross members 10 to the tread of the wheel. In order to lock the pawl 33 in operative position, that is in locking engagement with the strap, a laterally projecting keeper 36 is shiftably mounted at the under side of the pawl for engagement under one side of the buckle frame, as seen in Fig. 4. The keeper 36 is formed with a button 37 positioned at the upper side of the pawl which may be readily engaged by the thumb or finger in shifting said keeper. The pawl is slotted, as seen, to afford shifting for the keeper.

Each of the end members 24 is formed with an elongated lip 38 in which is provided a slot 39 adapted for engagement with the tongues 14 of connecting members 12, the engagement of the tongues of said connecting members being precisely the same as the engagement thereof with the connecting members 17, above described. The inner or rearward sides of the lips or lugs 38 are recessed, or cut away, in order to accommodate the corresponding sides of tongues 14 so as to provide a smooth surface without obstructions for engagement against the side of the tire.

With the construction set forth, it will be seen that an anti-skid device is provided which may be readily and easily adjusted to position upon a wheel and as readily and as easily removed therefrom. In case of wear of the cross members 10, the same may be readily and easily detached and replaced with new ones. The cross members 10 and side members 16 are formed preferably of rope or other fibrous flexible material which is chemically treated, as by impregnating the same with paraffin, or other suitable agent, in order to render the same waterproof and weather-proof. Also, in the connection of said cross members and side members with the various metallic devices engaging therewith, cement or other connecting agent may be employed to insure a rigid connection.

The arrangement of the cross members in pairs, with the ends of the members of each pair connected together, as shown and described, is of special advantage in that, with this arrangement, the members of each pair of cross pieces coöperate with each other to effectively prevent skidding. With this arrangement, when the brakes of the automobile are applied, as the cross pieces are brought into engagement with the pavement, one of the members of each pair of cross pieces will engage with the ground before the other. This being the case, the cross piece of each pair, contacting with the ground, will exert a pull rearwardly which will cause the other cross piece to be drawn into secure clamping engagement with the tire. This will relieve the strain upon the side fastening devices, and also prevent rotation of the wheel relative to the anti-skid device. It will thus be seen that the two connected cross pieces coöperate with each other in securing more effective engagement with the ground, and in more effectively preventing slipping of the tires upon the pavement.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a device of the class described, the combination of two elongated slender elements; means for connecting said elements together comprising a pair of connecting members arranged one on each of said elements, each of said connecting members having one end wrapped around the corresponding element; and a tongue on one of said connecting members engaging with a slot in the other of said connecting members, substantially as described.

2. In a device of the class described, the combination of two elongated slender elements; means for connecting said elements together comprising a pair of connecting members arranged one on each of said elements, each of said connecting members having one end wrapped around the corresponding element; a tongue on one of said connecting members engaging with a slot in the other of said connecting members; and means for locking said tongue in operative position, substantially as described.

3. In a device of the class described, the combination of two elongated slender elements; means for connecting said elements together comprising a pair of connecting members arranged one on each of said elements, each of said connecting members having one end wrapped around the corresponding element; a tongue on one of said connecting members engaging with a slot in the other of said connecting members; and a second tongue adapted for engagement with said first mentioned tongue to lock the same in operative position, substantially as described.

4. In a device of the class described, the combination of two elongated slender elements; means for connecting said elements together comprising a pair of connecting members arranged one on each of said elements, each of said connecting members having one end wrapped around the corresponding element; a shoulder on one of said connecting members engaging with said last mentioned end thereof to hold the same in operative position; and a tongue on one of said connecting members engaging with a slot in the other of said members, substantially as described.

5. In a device of the class described, the combination of two elongated slender elements; means for connecting said elements together comprising a pair of connecting members arranged one on each of said elements, each of said connecting members having one end wrapped around the corresponding element; and a tongue on one of said connecting members having a reduced end engaging with a slot in the other of said connecting members, said slotted connecting member being offset to accommodate one side of said tongue and to form a shoulder adapted to engage with the last mentioned end of said member to hold the same in operative position and for engagement with shoulders on said tongue to prevent relative lateral tilting, substantially as described.

In testimony whereof I have signed my name to this specification in the presence of two subscribing witnesses.

FLORIAN W. WEBER.

Witnesses:
JOSHUA R. H. POTTS,
HELEN F. LILLIS.

Copies of this patent may be obtained for five cents each, by addressing the "Commissioner of Patents, Washington, D. C."